US012372093B2

(12) United States Patent
Iwakiri et al.

(10) Patent No.: US 12,372,093 B2
(45) Date of Patent: Jul. 29, 2025

(54) CENTRIFUGAL COMPRESSOR AND TURBOCHARGER

(71) Applicant: MITSUBISHI HEAVY INDUSTRIES ENGINE & TURBOCHARGER, LTD., Sagamihara (JP)

(72) Inventors: Kenichiro Iwakiri, Tokyo (JP); Isao Tomita, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 266 days.

(21) Appl. No.: 17/435,922

(22) PCT Filed: Mar. 19, 2019

(86) PCT No.: PCT/JP2019/011532
§ 371 (c)(1),
(2) Date: Sep. 2, 2021

(87) PCT Pub. No.: WO2020/188763
PCT Pub. Date: Sep. 24, 2020

(65) Prior Publication Data
US 2022/0178377 A1 Jun. 9, 2022

(51) Int. Cl.
*F04D 17/10* (2006.01)
*F04D 29/46* (2006.01)

(52) U.S. Cl.
CPC ........... *F04D 17/10* (2013.01); *F04D 29/462* (2013.01); *F05D 2220/40* (2013.01); *F05D 2250/51* (2013.01)

(58) Field of Classification Search
CPC ............... F04D 15/0022; F04D 27/003; F04D 27/0253; F04D 27/002; F04D 27/0246;
(Continued)

(56) References Cited

U.S. PATENT DOCUMENTS 9,777,640 B2 * 10/2017 Mohtar ..................... F02C 9/16
2015/0192147 A1 7/2015 An et al.
(Continued)

FOREIGN PATENT DOCUMENTS

EP 1 947 299 A2 7/2008
EP 3 051 099 A1 8/2016
(Continued)

OTHER PUBLICATIONS

International Preliminary Report on Patentability and Written Opinion of the International Searching Authority for International Application No. PCT/JP2019/011532, dated Sep. 30, 2021, with an English translation.
(Continued)

*Primary Examiner* — Philip E Stimpert
(74) *Attorney, Agent, or Firm* — Birch, Stewart, Kolasch & Birch, LLP

(57) ABSTRACT

A centrifugal compressor comprises: an impeller; an inlet pipe portion forming an intake passage to introduce air to the impeller; and a throttle mechanism capable of reducing a flow passage area of the intake passage upstream of the impeller. When PA is a throttle position where the throttle mechanism minimizes the flow passage area of the intake passage, PB is a tip position of a leading edge of a blade of the impeller, L is a distance between the throttle position PA and the tip position PB of the leading edge in an axial direction of the impeller, and D is a diameter of the impeller at the tip position PB of the leading edge, the distance L and the diameter D satisfy L/D≤0.2.

8 Claims, 8 Drawing Sheets

(58) Field of Classification Search
CPC ...... F04D 29/462; F04D 17/10; F04D 29/464; F05D 2220/40; F05D 2250/50
See application file for complete search history.

(56) References Cited

U.S. PATENT DOCUMENTS

| | | | | |
|---|---|---|---|---|
| 2015/0354591 | A1 | 12/2015 | Ibaraki et al. | |
| 2016/0131145 | A1* | 5/2016 | Mohtar | F02B 37/22 417/380 |
| 2016/0146099 | A1 | 5/2016 | Mohtar et al. | |
| 2017/0298943 | A1 | 10/2017 | Mohtar et al. | |
| 2020/0011230 | A1* | 1/2020 | Hagelstein | F02M 26/06 |

FOREIGN PATENT DOCUMENTS

| | | | |
|---|---|---|---|
| JP | 4-311633 | A | 11/1992 |
| JP | 5223642 | B2 | 6/2013 |
| JP | 5824821 | B2 | 12/2015 |
| JP | 2018-131986 | A | 8/2018 |
| WO | WO 2014/030248 | A1 | 2/2014 |
| WO | WO 2014/128931 | A1 | 8/2014 |

OTHER PUBLICATIONS

International Search Report for International Application No. PCT/JP2019/011532, dated Jun. 25, 2019.

German Office Action for German Application No. 11 2019 006 767.2, dated Jul. 18, 2024, with English translation.

* cited by examiner

CENTRIFUGAL COMPRESSOR AND TURBOCHARGER

TECHNICAL FIELD

The present disclosure relates to a centrifugal compressor and a turbocharger.

BACKGROUND ART

In recent years, for widening the operating range and improving efficiency at the operating point on the low flow rate side (near the surge point) of a centrifugal compressor, it has been proposed to install a throttle mechanism (inlet variable mechanism) at the inlet pipe portion of the centrifugal compressor, as described in Patent Document 1, for example.

At the low flow rate operating point of the centrifugal compressor, backflow tends to occur on the tip side of the impeller blades. The throttle mechanism described in Patent Document 1 has an annular portion disposed in the intake passage to suppress the backflow, and reduces the flow passage area of the intake passage by blocking an outer peripheral portion of the intake passage corresponding to the tip side of the impeller blades. When the flow passage area of the intake passage is reduced, although the peak efficiency is reduced due to the reduced area, it is possible to reduce the surge flow rate and improve the efficiency near the surge point. In other words, by performing a variable control to increase the flow passage area of the intake passage during operation on the high flow rate side and to reduce the flow passage area of the intake passage during operation on the low flow rate side, it is possible to achieve wide range and improved efficiency at the operating point on the low flow rate side. This indicates that the impeller blade height is lowered (trimmed) to be adapted to the low flow rate operating point artificially, which is called variable inlet compressor (VIC) or variable trim compressor (VTC).

CITATION LIST

Patent Literature

Patent Document 1: U.S. Pat. No. 9,777,640B

SUMMARY

Problems to be Solved

When a throttle mechanism is installed at the inlet pipe portion of a centrifugal compressor, the efficiency improvement amount at the low flow rate operating point depends on specific conditions such as the throttle position of the intake passage and the flow passage area at the throttle position. However, Patent Document 1 does not disclose any knowledge on how to set the specific conditions to improve efficiency at the low flow rate operating point.

In view of the above, an object of at least one embodiment of the present invention is to provide a centrifugal compressor that can improve the efficiency at the low flow rate operating point, and a turbocharger including the same.

Solution to the Problems (1) A centrifugal compressor according to at least one embodiment of the present invention comprises: an impeller; an inlet pipe portion forming an intake passage to introduce air to the impeller; and a throttle mechanism capable of reducing a flow passage area of the intake passage upstream of the impeller. When PA is a throttle position where the throttle mechanism minimizes the flow passage area of the intake passage, PB is a tip position of a leading edge of a blade of the impeller, L is a distance between the throttle position PA and the tip position PB of the leading edge in an axial direction of the impeller, and D is a diameter of the impeller at the tip position PB of the leading edge, the distance L and the diameter D satisfy $L/D \leq 0.2$.

According to the inventor's knowledge, the smaller the ratio L/D in the above (1), the more it is possible to suppress the development of backflow at the tip side of the blade of the impeller at the low flow rate operating point, and the higher efficiency can be achieved at the low flow rate operating point. In particular, when $L/D \leq 0.2$ is satisfied, the efficiency at the low flow rate operating point can be significantly improved.

(2) In some embodiments, in the centrifugal compressor described in the above (1), the distance L and the diameter D satisfy $L/D \leq 0.1$.

With the above configuration (2), it is possible to achieve a higher efficiency at the low flow rate operating point.

(3) In some embodiments, in the centrifugal compressor described in the above (1) or (2), when A1 is an area of a circle having the diameter D, and A2 is a minimum flow passage area of the intake passage at the throttle position PA, the area A1 and the area A2 satisfy $0.55 < A2/A1 < 0.65$.

When the flow passage area of the intake passage is constricted by the throttle mechanism, the efficiency at the low flow rate operating point can be improved, but the efficiency at the high flow rate operating point tends to decrease. Accordingly, if the flow passage area of the intake passage is excessively constricted by the throttle mechanism, the performance characteristics are likely to rapidly change and become difficult to control. Thus, there is an appropriate range in the constriction amount of the flow passage area by the throttle mechanism.

According to the inventor's knowledge, A2/A1 such that the efficiency at the low flow rate operating point is maximum exists in the range satisfying $0.55 < A2/A1 < 0.65$, and the peak efficiency drops steeply in the region where A2/A1 is smaller than 0.55. Therefore, by setting A2/A1 to satisfy $0.55 < A2/A1 < 0.65$ as described in the above (3), it is possible to achieve a high efficiency at the low flow rate operating point and suppress the decrease in peak efficiency.

(4) A centrifugal compressor according to at least one embodiment of the present invention comprises: an impeller; an inlet pipe portion forming an intake passage to introduce air to the impeller; and a throttle mechanism capable of reducing a flow passage area of the intake passage. When D is a diameter of the impeller at a tip position of a leading edge of a blade of the impeller, A1 is an area of a circle having the diameter D, PA is a throttle position where the throttle mechanism minimizes the flow passage area of the intake passage, and A2 is a minimum flow passage area of the intake passage at the throttle position PA, the area A1 and the area A2 satisfy $0.55 < A2/A1 < 0.65$.

When the flow passage area of the intake passage is constricted by the throttle mechanism, the efficiency at the low flow rate operating point can be improved, but the efficiency at the high flow rate operating point tends to decrease. Accordingly, if the flow passage area of the intake passage is excessively constricted by the throttle mechanism, the performance characteristics are likely to rapidly change and become difficult to control. Thus, there is an appropriate range in the constriction amount of the flow passage area by the throttle mechanism.

According to the inventor's knowledge, A2/A1 such that the efficiency at the low flow rate operating point is maximum exists in the range satisfying $0.55<A2/A1<0.65$, and the peak efficiency drops steeply in the region where A2/A1 is smaller than 0.55. Therefore, by setting A2/A1 to satisfy $0.55<A2/A1<0.65$ as described in the above (4), it is possible to achieve a high efficiency at the low flow rate operating point and suppress the decrease in peak efficiency.

(5) In some embodiments, in the centrifugal compressor described in the above (3) or (4), the area A1 and the area A2 satisfy $0.58<A2/A1<0.62$.

With the above configuration (5), it is possible to achieve a higher efficiency at the low flow rate operating point and suppress the decrease in peak efficiency.

(6) In some embodiments, in the centrifugal compressor described in any one of the above (1) to (5), the throttle mechanism includes an annular portion disposed in the intake passage. The annular portion is configured to move between a first position and a second position upstream of the first position in the axial direction of the impeller.

With the centrifugal compressor described in the above (6), the constriction amount of the flow passage area of the intake passage can be adjusted by moving the annular portion along the axial direction.

(7) In some embodiments, in the centrifugal compressor described in the above (6), in a cross-section along a rotational axis of the impeller, a straight line connecting a leading edge and a trailing edge of the annular portion is inclined inward in a radial direction of the impeller as going downstream in the axial direction.

In order to increase the effect of efficiency improvement at the low flow rate operating point by the throttle mechanism, it is desirable to secure a certain constriction amount of the flow passage area of the intake passage. If the constriction amount by the throttle mechanism is increased by simply increasing the thickness of the annular portion (thickness in the direction perpendicular to the straight line connecting the leading edge and the trailing edge of the annular portion), the pressure loss when air passes through the annular portion increases as the thickness of the annular portion increases.

On the other hand, as shown in the above (7), when the straight line connecting the leading edge and the trailing edge of the annular portion is inclined inward in the radial direction as it goes downstream in the axial direction, the constriction amount by the throttle mechanism can be increased while suppressing the increase in thickness of the annular portion. Accordingly, it is possible to efficiently increase the efficiency at the low flow rate operating point while suppressing the increase in pressure loss due to the thickness of the annular portion.

(8) In some embodiments, in the centrifugal compressor described in the above (7), an inner peripheral surface of the inlet pipe portion includes an inclined surface that is inclined such that an inner diameter of the inlet pipe portion increases downstream in the axial direction. In a cross-section along the rotational axis of the impeller, an angle between the straight line and the axial direction is smaller than an angle between the inclined surface and the axial direction.

When the annular portion is in the second position, since the annular portion is separated from the inclined surface of the inlet pipe portion inward in the radial direction, the angle between the streamline near the annular portion and the axial direction is smaller than the angle between the inclined surface and the axial direction. Therefore, when the angle between the straight line connecting the leading edge and the trailing edge of the annular portion and the axial direction is smaller than the angle between the inclined surface and the axial direction as described above, the air can smoothly flow along the annular portion, and the pressure loss due to the annular portion can be effectively reduced.

(9) A turbocharger according to at least one embodiment of the present invention comprises a centrifugal compressor described in any one of the above (1) to (8).

With the centrifugal compressor described in the above (9), since the centrifugal compressor described in any one of the above (1) to (8) is included, it is possible to achieve a high efficiency at the low flow rate operating point.

Advantageous Effects

At least one embodiment of the present invention provides a centrifugal compressor that can improve the efficiency at the low flow rate operating point, and a turbocharger including the same.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
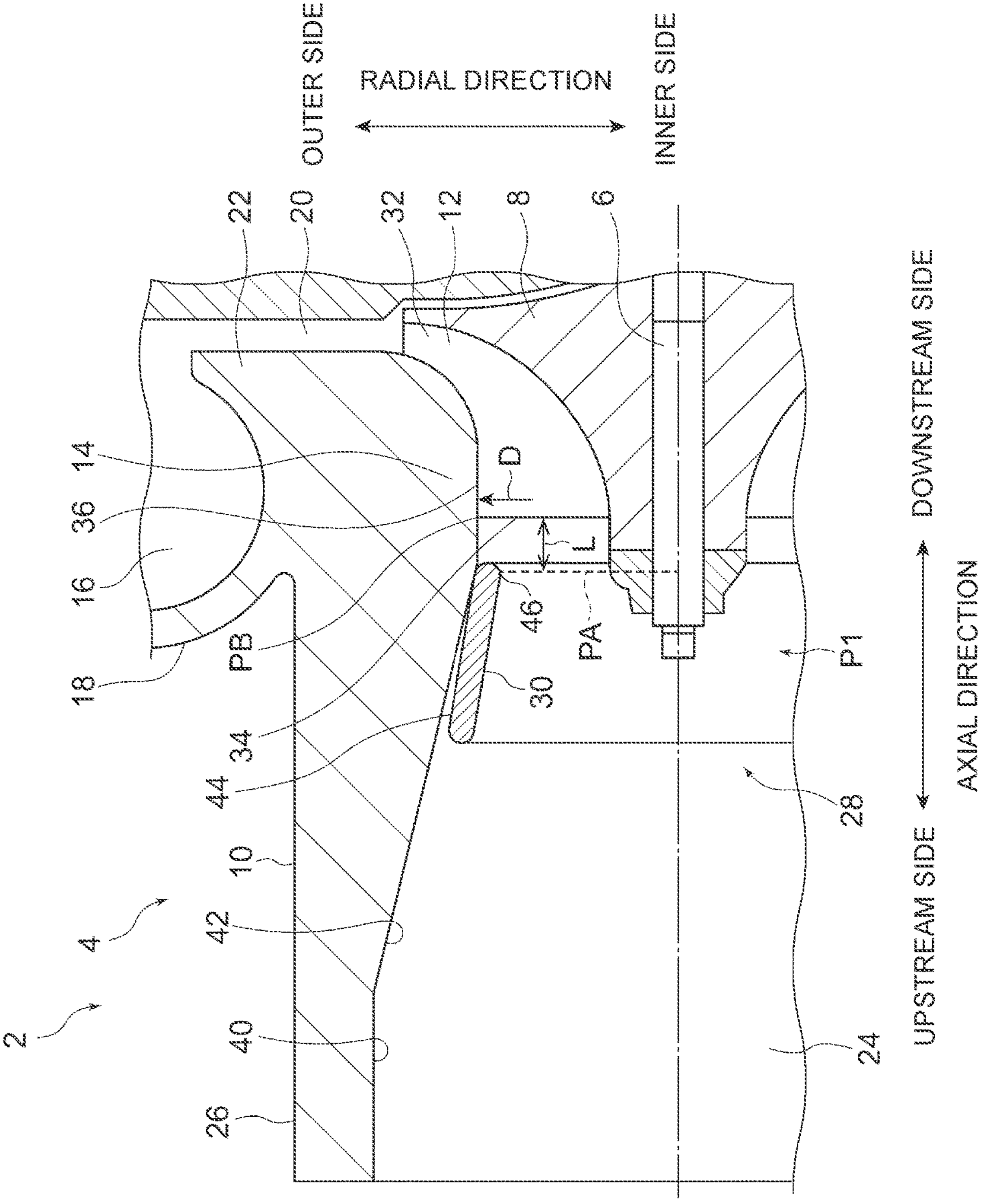
FIG. 1 is a schematic cross-sectional view of a centrifugal compressor 4 of a turbocharger 2 according to an embodiment of the present invention, showing the state where a throttle mechanism 28 reduces the flow passage area of an intake passage 24 at a throttle position PA near the inlet of an impeller 8 (the state where an annular portion 30 is in a first position P1).

FIG. 1 is a schematic cross-sectional view of a centrifugal compressor 4 of a turbocharger 2 according to an embodiment. The centrifugal compressor 4 is connected to a turbine (not shown) via a rotational shaft 6, and compresses the air taken by an internal combustion engine (not shown) as the rotational power of the turbine driven by exhaust gas of the internal combustion engine (not shown) is transmitted via the rotational shaft 6.

As shown in FIG. 1, the centrifugal compressor 4 includes an impeller 8 and a casing 10 housing the impeller 8. The casing 10 includes a shroud wall portion 14 surrounding the impeller 8 so as to form an impeller housing space 12 in which the impeller 8 is placed, a scroll portion 18 forming a scroll passage 16 on the outer peripheral side of the impeller housing space 12, and a diffuser portion 22 forming a diffuser passage 20 connecting the impeller housing space 12 and the scroll passage 16. Further, the casing 10 includes an inlet pipe portion 26 forming an intake passage 24 to introduce air to the impeller 8 along the rotational axis of the impeller 8. The inlet pipe portion 26 is disposed concentrically with the impeller 8.

Hereinafter, the axial direction of the impeller 8 is referred to as merely "axial direction", and the radial direction of the impeller 8 is referred to as merely "radial direction", and the circumferential direction of the impeller 8 is referred to as merely "circumferential direction".

The centrifugal compressor 4 includes a throttle mechanism 28 (inlet variable mechanism) capable of reducing the flow passage area of the intake passage 24 upstream of the impeller 8 in the axial direction. The throttle mechanism 28 includes an annular portion 30 (movable portion) disposed in the intake passage 24 concentrically with the impeller 8.

In the illustrated exemplary embodiment, the annular portion 30 is configured to be movable along the axial direction between a first position P1 (see FIG. 1) and a second position P2 (see FIG. 2) upstream of the first position P1 in the axial direction. The annular portion 30 is supported by a strut (not shown), and moves between the first position P1 and the second position P2 by the driving force transmitted from an actuator (not shown) through the strut.

An inner peripheral surface 40 of the inlet pipe portion 26 includes an inclined surface 42 that is inclined such that the inner diameter of the inlet pipe portion 26 increases upstream in the axial direction in order to suppress the increase in pressure loss due to the annular portion 30. In the illustrated exemplary embodiment, the inclined surface 42 is linearly shaped in a cross-section along the rotational axis of the impeller 8.

An outer peripheral surface 44 of the annular portion 30 is disposed so as to face the inclined surface 42. When the annular portion 30 is in the second position P2, the outer peripheral surface 44 of the annular portion 30 is separated from the inclined surface 42. As the annular portion 30 moves downstream in the axial direction from the second position P2, the distance between the outer peripheral surface 44 of the annular portion 30 and the inclined surface 42 decreases. The annular portion 30 is configured to come into contact with the inclined surface 42 when it is in the first position P1 to block an outer peripheral portion 38 of the intake passage 24 corresponding to a tip portion 36 of a blade 32 of the impeller 8 (a radially outer end portion of the blade 32). The annular portion 30 faces a leading edge 34 of the tip portion 36 of the blade 32 of the impeller 8 in the axial direction when it is in the first position P1. In other words, in an axial view, the annular portion 30 and the tip portion 36 at least partially overlap.

Thus, the annular portion 30 reduces the flow passage area of the intake passage 24 of the impeller 8 by blocking the outer peripheral portion 38 of the intake passage 24 corresponding to the tip portion 36 of the blade 32 of the impeller 8. As a result, although the peak efficiency is reduced due to the reduced flow passage area, it is possible to reduce the surge flow rate and improve the efficiency near the surge point. In other words, by adjusting the throttle mechanism 28 so that the annular portion 30 is in the first position P1 at the low flow rate operating point (operating point near the surge point) and the annular portion 30 is in the second position P2 at the high flow rate operating point (for example, during rated operation) where the flow rate is higher than the low flow rate operating point, the efficiency of the low flow rate operating point can be improved, and the operating range of the centrifugal compressor 4 can be expanded.

Here, as shown in FIG. 1, when PA is a throttle position (position in the axial direction) where the throttle mechanism 28 minimizes the flow passage area of the intake passage 24, PB is a tip position of the leading edge 34 of the blade 32 of the impeller 8, L is a distance between the throttle position PA and the tip position PB of the leading edge 34 in the axial direction, and D is a diameter of the impeller 8 at the tip position PB of the leading edge 34, the distance L and the diameter D satisfy $L/D \leq 0.2$. More preferably, the distance L and the diameter D satisfy $L/D \leq 0.1$. In the illustrated exemplary embodiment, the throttle position PA corresponds to the position of an inner peripheral end 46 (a radially inner end) of the annular portion 30 when the annular portion 30 is in the first position P1. The diameter D corresponds to twice the distance between the tip position PB of the leading edge 34 and the rotational axis of the impeller 8.

When A1 is an area of a circle having the diameter D ($=D^2*\pi/4$), and A2 is a minimum flow passage area of the intake passage 24 constricted by the throttle mechanism 28 at the throttle position PA, the area A1 and the area A2 satisfy $0.55<A2/A1<0.65$. More preferably, the area A1 and the area A2 satisfy $0.58<A2/A1<0.62$.

Figure 3:
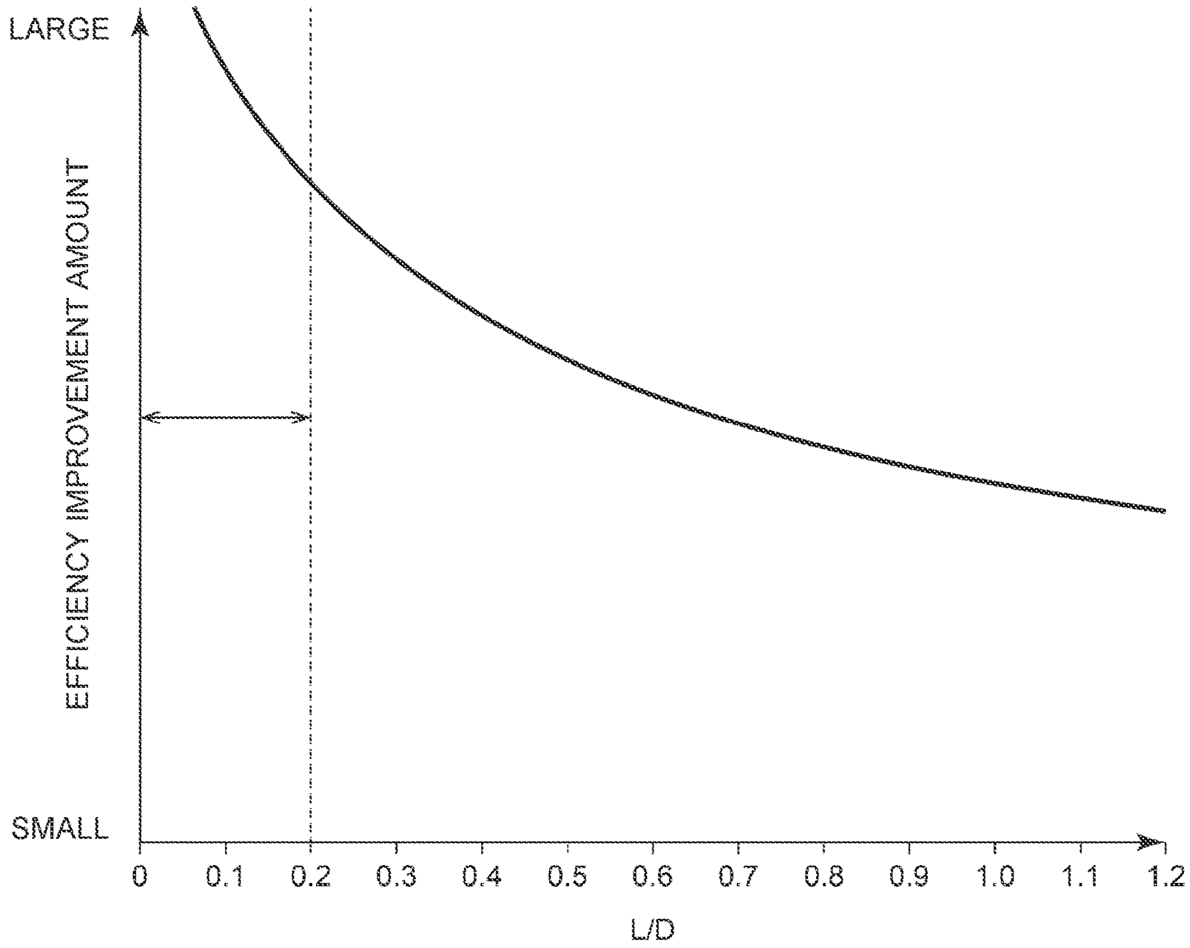
FIG. 3 is a diagram showing a relationship between the ratio L/D of the distance L to the diameter D and the improvement amount of the compressor efficiency at the low flow rate operating point.
Figure 4:
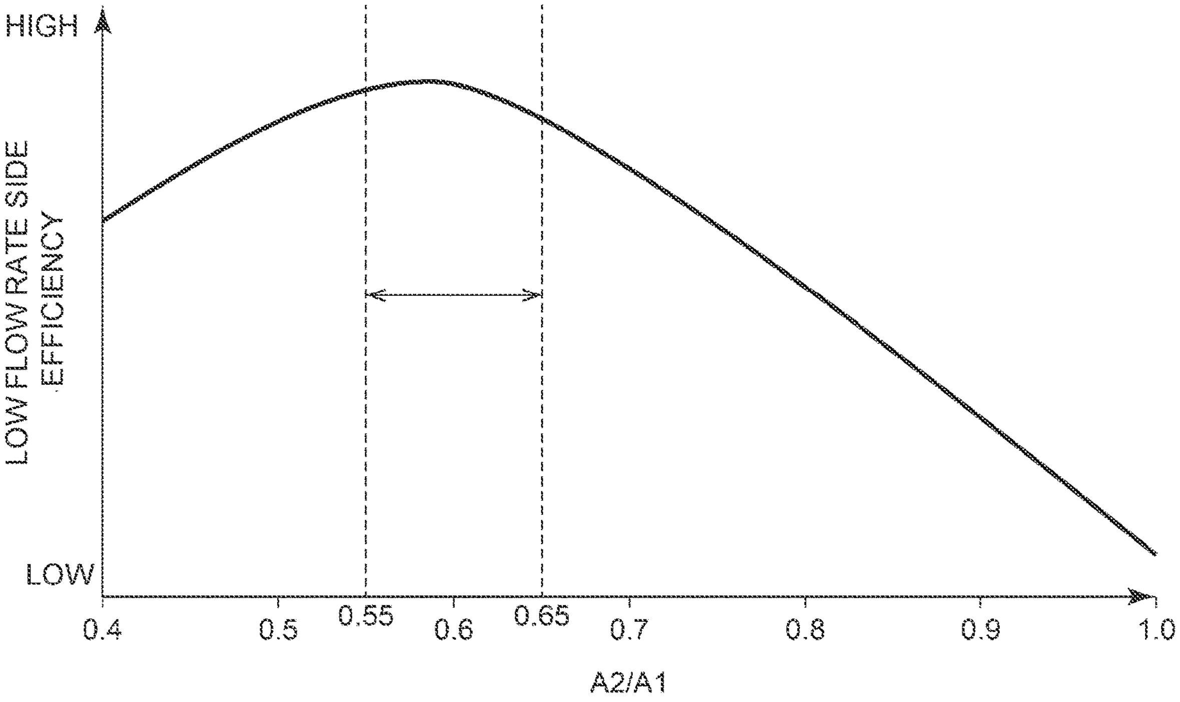
FIG. 4 is a diagram showing a relationship between the ratio A2/A1 and the compressor efficiency at the low flow rate operating point.
Figure 5:
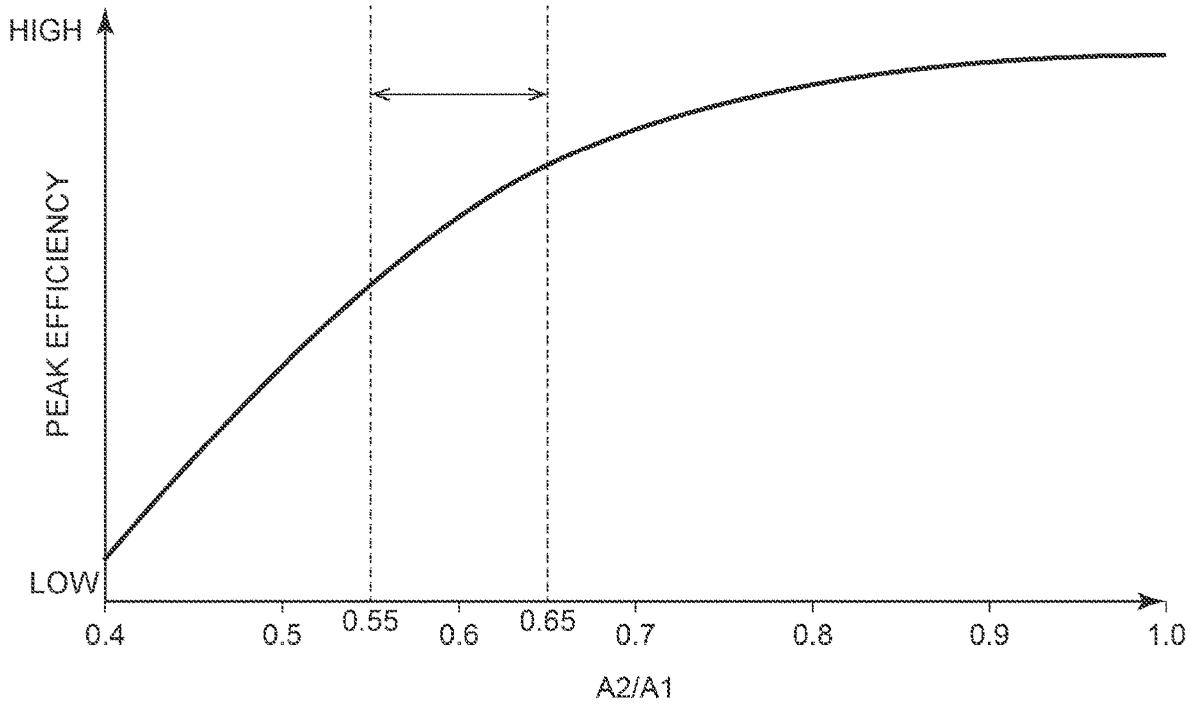
FIG. 5 is a diagram showing a relationship between the ratio A2/A1 and the peak efficiency.

FIG. 3 is a diagram showing a relationship between the ratio L/D of the distance L to the diameter D and the improvement amount of the compressor efficiency at the low flow rate operating point. Here, the improvement amount of the compressor efficiency means the improvement amount of the compressor efficiency compared to the case where the throttle mechanism 28 is not provided. FIG. 4 is a diagram showing a relationship between the ratio A2/A1 and the compressor efficiency at the low flow rate operating point. FIG. 5 is a diagram showing a relationship between the ratio A2/A1 and the peak efficiency.

In the throttle mechanism 28, the outer peripheral portion 38 of the intake passage 24 is blocked in order to suppress the development of backflow that occurs at the tip side of the blade 32 during operation at the low flow side operating point. Accordingly, as shown in FIG. 3, the smaller the ratio L/D, the closer the throttle position PA, where the throttle mechanism 28 minimizes the flow passage area of the intake passage 24, to the leading edge 34 of the impeller 8, and the smaller the degree of development of backflow on the tip side of the blade 32 of the impeller 8, thus improving the efficiency at the low flow side operating point. In particular, when L/D≤0.2 is satisfied, the effect of efficiency improvement at the low flow rate operating point is significant.

Meanwhile, when the flow passage area of the intake passage 24 is constricted by the throttle mechanism 28, the efficiency at the low flow rate operating point can be improved, but the efficiency at the high flow rate operating point tends to decrease. Accordingly, if the flow passage area of the intake passage 24 is excessively constricted by the throttle mechanism 28, the performance characteristics are likely to rapidly change and become difficult to control. Thus, there is an appropriate range in the constriction amount of the flow passage area by the throttle mechanism 28.

The inventor's analysis revealed that, as shown in FIG. 4, A2/A1 such that the efficiency at the low flow rate operating point is maximum exists in the range satisfying 0.55<A2/A1<0.65, and as shown in FIG. 5, the peak efficiency drops steeply in the region where A2/A1 is smaller than 0.55. Therefore, by setting the ratio A2/A1 to satisfy 0.55<A2/A1<0.65, it is possible to achieve a high efficiency at the low flow rate operating point and suppress the decrease in peak efficiency.

Figure 2:
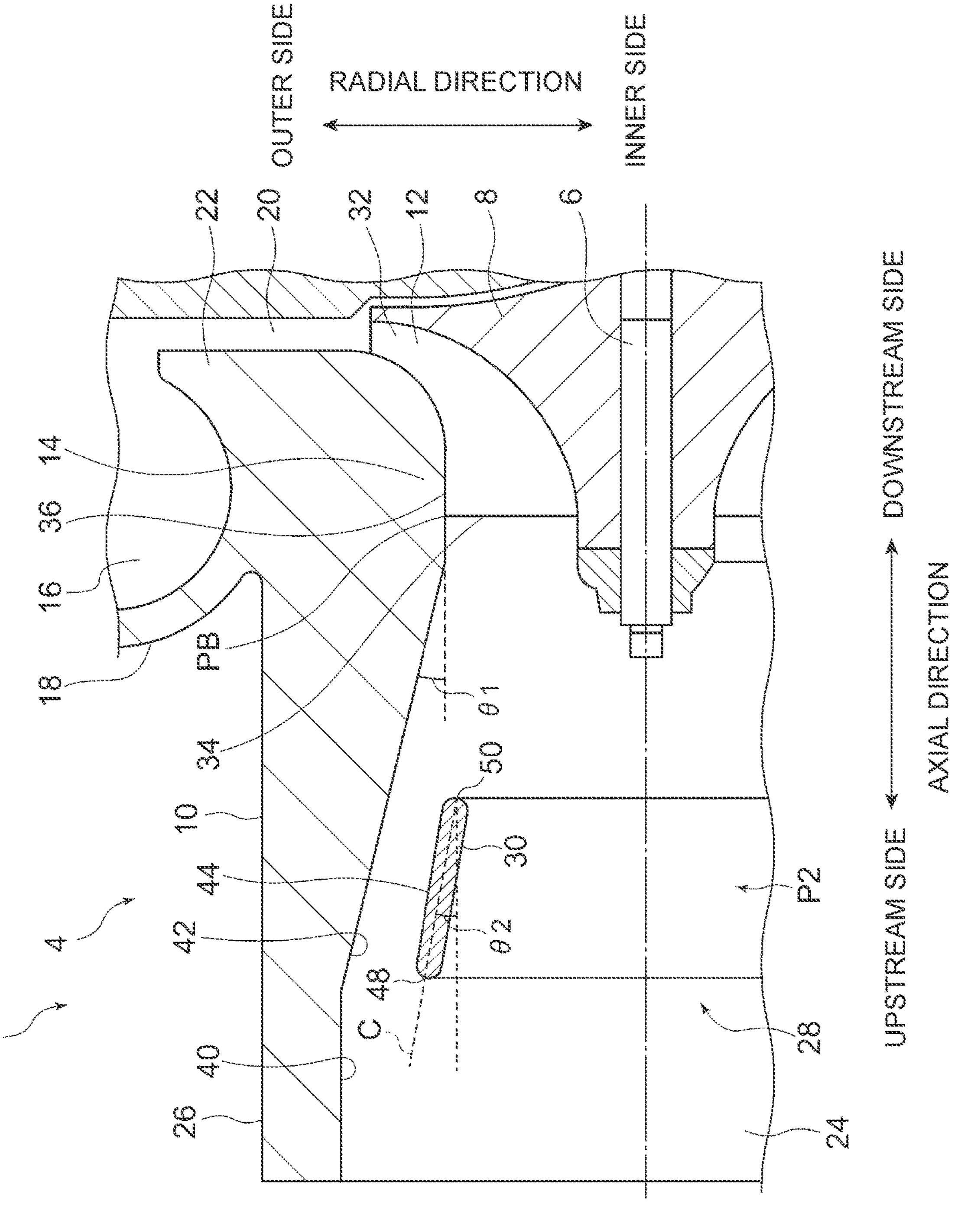
FIG. 2 shows the state where the annular portion 30 is in a second position P2 in the centrifugal compressor 4 shown in FIG. 1.

In some embodiments, for example as shown in FIG. 2, in a cross-section along the rotational axis of the impeller 8, a straight line C connecting a leading edge 48 and a trailing edge 50 of the annular portion 30 is inclined inward in the radial direction as it goes downstream in the axial direction. The leading edge 48 of the annular portion 30 means the upstream end of the annular portion 30 in the axial direction, and the trailing edge 50 of the annular portion 30 means the downstream end of the annular portion 30 in the axial direction.

Figure 6:
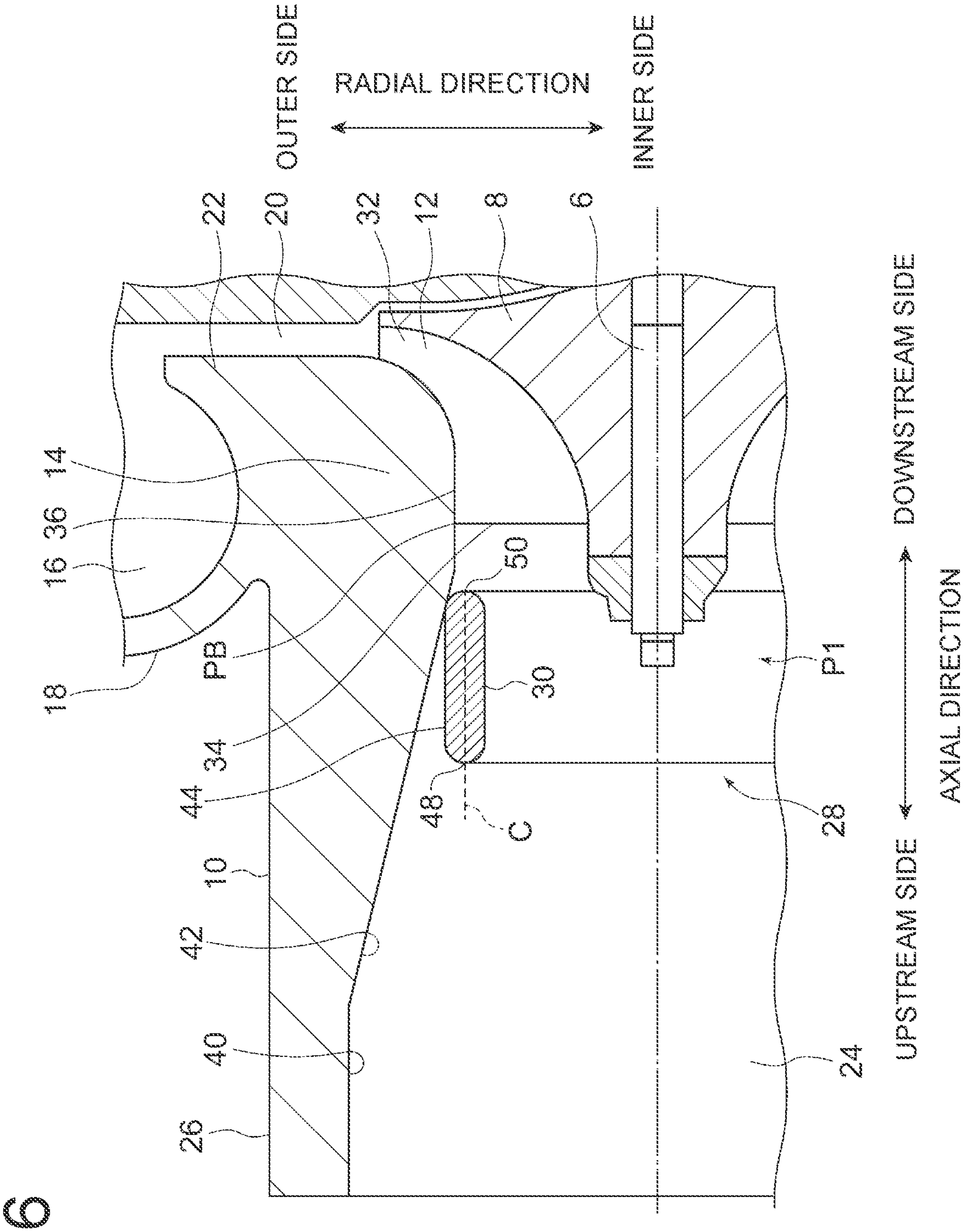
FIG. 6 is a schematic cross-sectional view of the centrifugal compressor 4 according to another embodiment.

In order to increase the effect of efficiency improvement at the low flow rate operating point by the throttle mechanism 28, it is desirable to secure a certain constriction amount of the flow passage area of the intake passage 24. Here, as shown in FIG. 6, in the annular portion 30 with the straight line C parallel to the axial direction, if the constriction amount by the throttle mechanism 28 is increased by increasing the thickness of the annular portion 30 (thickness in the direction perpendicular to the straight line C), the pressure loss when air passes through the annular portion 30 increases with the increase in thickness of the annular portion 30.

On the other hand, in the embodiment shown in FIGS. 1 and 2, since the straight line C is inclined as described above, the constriction amount by the throttle mechanism 28 can be increased while suppressing the increase in thickness of the annular portion 30. Accordingly, it is possible to efficiently increase the efficiency at the low flow rate operating point while suppressing the increase in pressure loss due to the thickness of the annular portion 30. Further, the increase in pressure loss can also be suppressed in that the air flow along the inclined surface 42 can be smoothly directed to the downstream side of the annular portion 30.

Further, as shown in FIG. 2, in a cross-section along the rotational axis of the impeller 8, an angle θ2 between the straight line C and the axial direction is smaller than an angle θ1 between the inclined surface 42 and the axial direction. When the annular portion 30 is in the second position P2, since the annular portion 30 is separated from the inclined surface 42 inward in the radial direction, the angle between the streamline near the annular portion 30 and the axial direction is smaller than the angle θ1 between the inclined surface 42 and the axial direction. Therefore, when the angle θ2 is smaller than the angle θ1 as described above, the air can smoothly flow along the annular portion 30, and the pressure loss due to the annular portion 30 can be effectively reduced.

The present invention is not limited to the embodiments described above, but includes modifications to the embodiments described above, and embodiments composed of combinations of those embodiments.

For example, in the above-described embodiments, the throttle mechanism 28 reduces the flow passage area of the intake passage 24 upstream of the impeller 8 by moving the annular portion 30 along the axial direction from the second position P2 to the first position P1.

Figure 7:
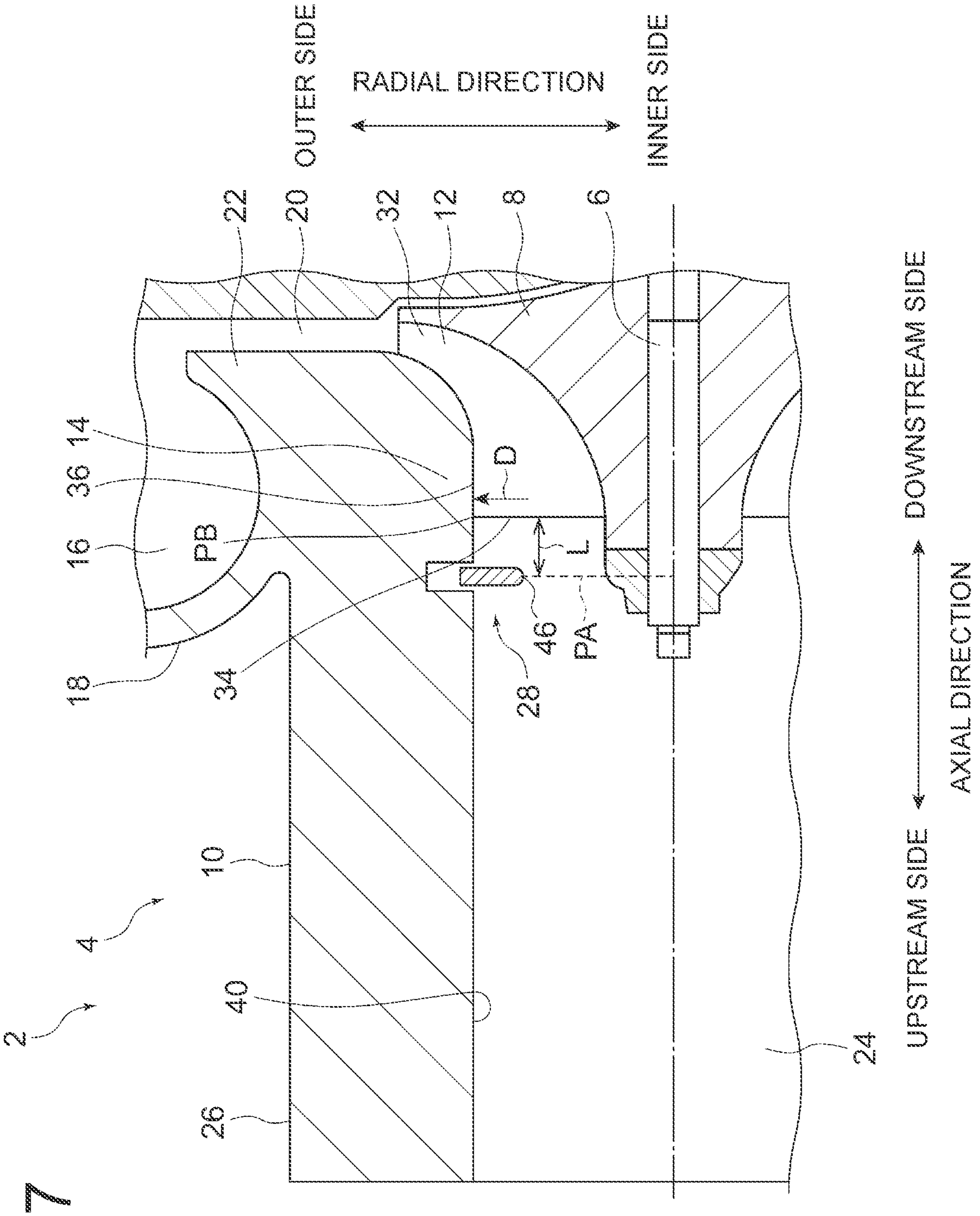
FIG. 7 is a schematic cross-sectional view of the centrifugal compressor 4 according to another embodiment.

However, the configuration of the throttle mechanism 28 is not limited to the above-described embodiments. For example as shown in FIG. 7, it may be configured to reduce the flow passage area of the outer peripheral portion 38 of the intake passage 24 by movement to protrude inward in the radial direction from the inner peripheral surface of the inlet pipe portion 26.

Figure 8:
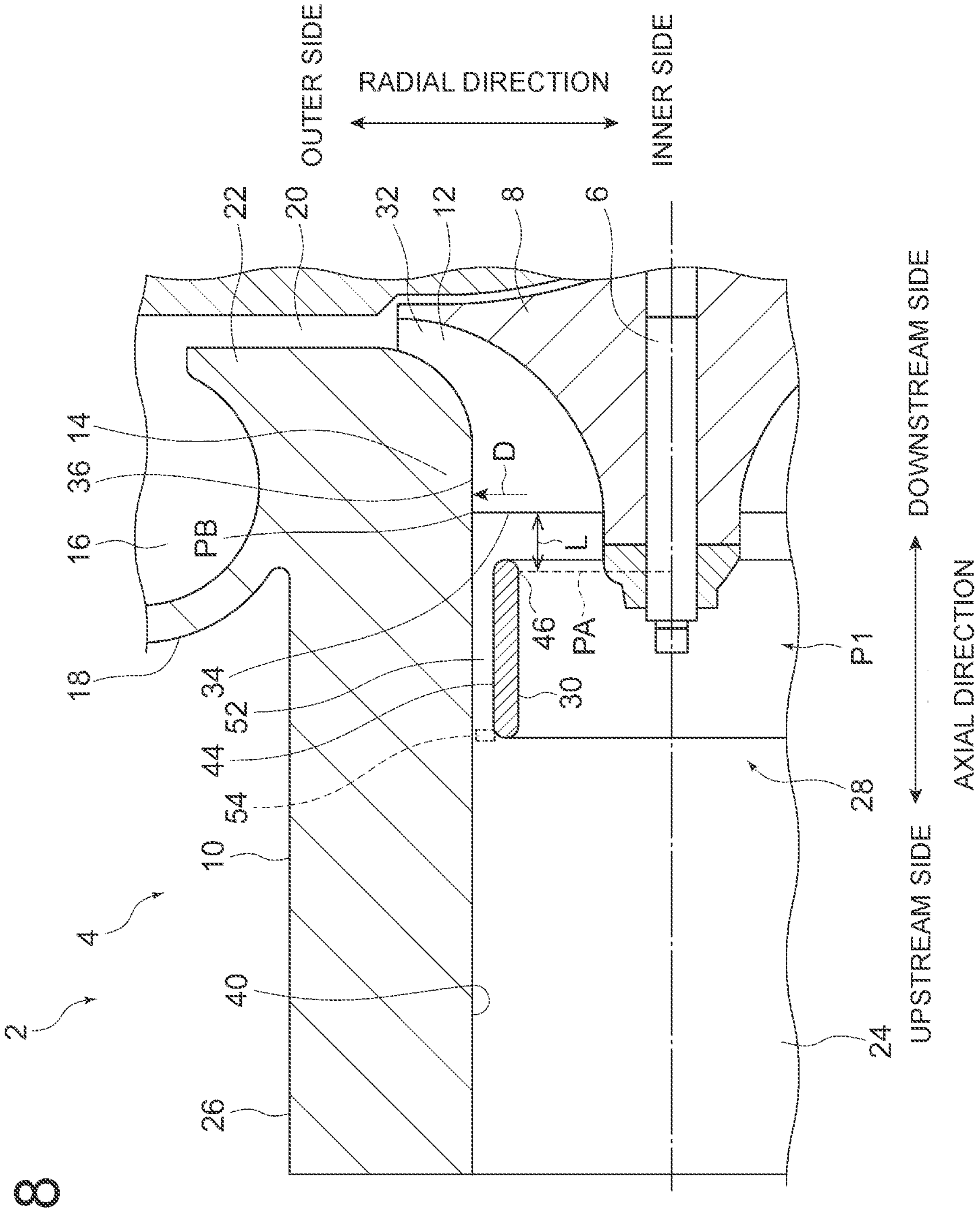
FIG. 8 is a schematic cross-sectional view of the centrifugal compressor 4 according to another embodiment.

Alternatively, for example as shown in FIG. 8, the annular portion 30 may be fixed so that it does not move relative to the inlet pipe portion 26 with a gap in the radial direction to the inner peripheral surface 40 of the inlet pipe portion 26. In this case, the throttle mechanism 28 includes an opening/closing member 54, such as a shutter, for opening and closing a flow passage portion 52 of the intake passage 24 of the inlet pipe portion 26, which is on the outer peripheral side of the annular portion 30.

As described above, the configuration of the throttle mechanism 28 is not limited, and any method other than those described above can be adapted. In any case, as in the embodiment shown in FIGS. 1 and 2, when L/D≤0.2 is satisfied, a high efficiency at the low flow rate operating point can be achieved. Further, by setting the ratio A2/A1 to satisfy 0.55<A2/A1<0.65, it is possible to achieve a high efficiency at the low flow rate operating point and suppress the decrease in peak efficiency.

REFERENCE SIGNS LIST

2 Turbocharger
4 Centrifugal compressor
6 Rotational shaft
8 Impeller
10 Casing
12 Impeller housing space
14 Shroud wall portion
16 Scroll passage
18 Scroll portion
20 Diffuser passage
22 Diffuser portion
24 Intake passage
26 Inlet pipe portion
28 Throttle mechanism
30 Annular portion
32 Blade
34 Leading edge
36 Tip portion
38 Outer peripheral portion
40 Inner peripheral surface

42 Inclined surface
44 Outer peripheral surface
46 Inner peripheral end
48 Leading edge
50 Trailing edge
52 Flow passage portion
54 Opening/closing member

The invention claimed is:

1. A centrifugal compressor, comprising:
an impeller;
an inlet pipe portion forming an intake passage to introduce air to the impeller; and
a throttle mechanism capable of reducing a flow passage area of the intake passage,
wherein, when D is a diameter of the impeller at a tip position of a leading edge of a blade of the impeller, A1 is an area of a circle having the diameter D, PA is a throttle position where the throttle mechanism minimizes the flow passage area of the intake passage, and A2 is a minimum flow passage area of the intake passage at the throttle position PA,
the area A1 and the area A2 satisfy $0.55<A2/A1<0.65$,
wherein the throttle mechanism includes an annular portion disposed in the intake passage, and
wherein the annular portion is configured to move between a first position and a second position upstream of the first position in an axial direction of the impeller,
wherein an inner peripheral surface of the inlet pipe portion includes an inclined surface that is inclined such that an inner diameter of the inlet pipe portion increases upstream in the axial direction, and a surface that connects to a downstream end of the inclined surface in the axial direction and extends parallel to a rotational axis of the impeller, and
wherein when the annular portion is in the first position, a downstream end portion in the axial direction of the annular portion is in contact with the inclined surface at a position that either overlaps with the throttle position PA in the axial direction or is located downstream of the throttle position PA.

2. The centrifugal compressor according to claim 1,
wherein the throttle mechanism is capable of reducing the flow passage area of the intake passage upstream of the impeller, and
wherein, when PB is a tip position of a leading edge of a blade of the impeller, and L is a distance between the throttle position PA and the tip position PB of the leading edge in the axial direction of the impeller,
the distance L and the diameter D satisfy $L/D \leq 0.2$.

3. The centrifugal compressor according to claim 2,
wherein the distance L and the diameter D satisfy $L/D \leq 0.1$.

4. The centrifugal compressor according to claim 1,
wherein the area A1 and the area A2 satisfy $0.58<A2/A1<0.62$.

5. The centrifugal compressor according to claim 1,
wherein, in a cross-section along a rotational axis of the impeller, a straight line connecting a leading edge and a trailing edge of the annular portion is inclined inward in a radial direction of the impeller as going downstream in the axial direction.

6. The centrifugal compressor according to claim 5,
wherein an inner peripheral surface of the inlet pipe portion includes an inclined surface that is inclined such that an inner diameter of the inlet pipe portion increases upstream in the axial direction, and
wherein, in a cross-section along the rotational axis of the impeller, an angle between the straight line and the axial direction is smaller than an angle between the inclined surface and the axial direction.

7. A turbocharger, comprising the centrifugal compressor according to claim 1.

8. The centrifugal compressor according to claim 1,
wherein, in a cross-section along the rotational axis of the impeller, the inclined surface includes a linear inclined line formed in a straight line, and the annular portion is in contact with the linear inclined line in a state where the annular portion is at the first position, and
wherein, in a cross-section along the rotational axis of the impeller, defining an imaginary line extending the linear inclined line downstream of the intake passage as a downstream extension line, the annular portion does not intersect with the downstream extension line when the annular portion is in contact with the linear inclined line.

* * * * *